449X
W. Hopkins,
Ship Building
Patented. May. 13. 1803.
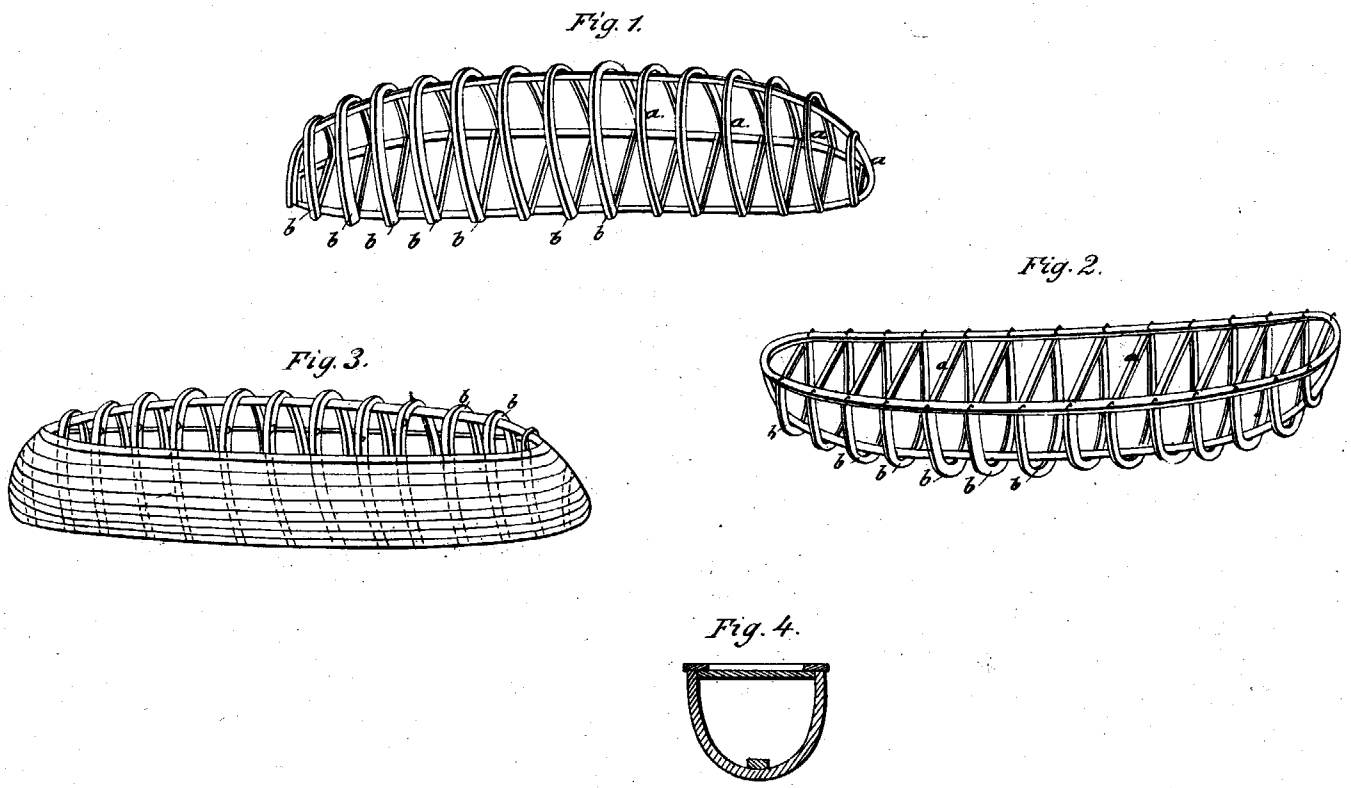
N. PETERS, PHOTO-LITHOGRAPHER, WASHINGTON, D. C.

[illegible] May 13, 1803

William Hopkins

Letters Patent. [illegible] May 13. 1803.

The schedule referred to in these Letters Patent and making
part of the same, containing a description in the words of
the said William Hopkins himself of his improvement of
building Boats.

A mould is made exactly the form and size of a boat
of crooked timber with vacancies between each timber in order to
hook on iron hooks said mould being turned bottom upwards
the timbers of the boat are fastened at one end and bent over
the mould one after another regularly untill the boat is timbered
out. then the planks are bent on in the common manner only
with much more facility, the work being all solid and the
hoods hauled close with much more ease, then the boat
remaining on the mould may be smoothed off, caulked and
payed: then being turned off there remains but little to do
to finish the boat which is much stronger built of bent
timbers than in the common manner, where they are obliged
to work timbers often much across the grain which makes
them very liable to break. The boat is built upon the
same principle that a shoe maker builds his shoe that is
upon a last, the timber being heated with steam will bend
with ease and all the work of setting up a boat and putting
on ribbons and hanging the [illegible] &c, is prevented.—

Signed in the presence of

Nathan Cole Junior } William Hopkins
Eunice [illegible] }

(270 words) (Patented May 13. 1803) [illegible]

[illegible]